United States Patent
Lee et al.

(10) Patent No.: US 10,061,414 B2
(45) Date of Patent: Aug. 28, 2018

(54) TOUCH PANEL

(71) Applicant: LG INNOTEK CO., LTD., Seoul (KR)

(72) Inventors: Seung Heon Lee, Seoul (KR); Jae Joon Jang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 246 days.

(21) Appl. No.: 14/719,958

(22) Filed: May 22, 2015

(65) Prior Publication Data

US 2016/0117002 A1   Apr. 28, 2016

(30) Foreign Application Priority Data

Oct. 22, 2014 (KR) .................. 10-2014-0143350
Jan. 27, 2015 (KR) .................. 10-2015-0012810

(51) Int. Cl.
*G06F 3/041* (2006.01)
*G06F 3/044* (2006.01)

(52) U.S. Cl.
CPC .............. *G06F 3/041* (2013.01); *G06F 3/044* (2013.01); *G06F 3/0412* (2013.01); *G06F 2203/04107* (2013.01)

(58) Field of Classification Search
CPC ........ G06F 3/041; G06F 3/0412; G06F 3/044; G06F 2203/04107

(Continued)

(56) References Cited

U.S. PATENT DOCUMENTS

| | | | |
|---|---|---|---|
| 8,970,537 B1* | 3/2015 | Shepelev | G06F 3/044 178/18.01 |
| 2007/0008299 A1* | 1/2007 | Hristov | G06F 3/0416 345/173 |

(Continued)

FOREIGN PATENT DOCUMENTS

| | | |
|---|---|---|
| KR | 10-2010-0095886 A | 9/2010 |
| KR | 20100095886 A | 9/2010 |

(Continued)

OTHER PUBLICATIONS

Office Action dated Feb. 22, 2016 in Korean Application No. 10-2015-0012810.

(Continued)

*Primary Examiner* — Kwin Xie
(74) *Attorney, Agent, or Firm* — Saliwanchick, Lloyd & Eisenschenk

(57) ABSTRACT

A touch panel of the embodiment includes a substrate including an active area and an unactive area; a sensing electrode on the active area; a wire electrode on the unactive area; and a connection electrode connected to at least one of the sensing electrode and the wire electrode, wherein at least one of the sensing electrode and the wire electrode includes a plurality of openings, and the openings are divided by the connection electrode. A touch panel of another embodiment includes a substrate including an active area and an unactive area; a sensing electrode on the active area; and a wire electrode on the unactive area, wherein the sensing electrode comprises a plurality of openings, and the openings extend in a direction corresponding to an extension direction of the sensing electrode.

17 Claims, 12 Drawing Sheets

(58) Field of Classification Search
USPC .................................................. 345/173–174
See application file for complete search history.

(56) References Cited

U.S. PATENT DOCUMENTS

| | | |
|---|---|---|
| 2008/0277259 A1 | 11/2008 | Chang |
| 2010/0265210 A1 | 10/2010 | Nakanishi et al. |
| 2011/0247884 A1* | 10/2011 | Kim ........................ G06F 3/044 |
| | | 178/18.03 |
| 2011/0291977 A1* | 12/2011 | Moriwaki ......... G02F 1/136286 |
| | | 345/173 |
| 2013/0050108 A1* | 2/2013 | Hong ...................... G06F 3/044 |
| | | 345/173 |
| 2013/0334017 A1 | 12/2013 | Hwang et al. |
| 2014/0285728 A1 | 9/2014 | Lee |
| 2015/0277634 A1* | 10/2015 | Oem ....................... G06F 3/046 |
| | | 345/173 |
| 2015/0277643 A1* | 10/2015 | Kim ....................... G06F 1/1626 |
| | | 345/173 |

FOREIGN PATENT DOCUMENTS

| | | |
|---|---|---|
| KR | 10-2013-0073859 A | 7/2013 |
| KR | 20140115126 A | 9/2014 |
| WO | WO-2012/014206 A2 | 2/2012 |
| WO | WO-2014/178835 A1 | 11/2014 |

OTHER PUBLICATIONS

Partial European Search Report dated Mar. 16, 2016 in European Application No. 15169016.1.

\* cited by examiner

TOUCH PANEL

CROSS-REFERENCES TO RELATED APPLICATIONS

This application claims the benefit under 35 U.S.C. § 119 of Korean Patent Application Nos. 10-2014-0143350, filed Oct. 22, 2014 and 10-2015-0012810, filed Jan. 27, 2015, which are hereby incorporated by reference in their entirety.

BACKGROUND

Technical Field

The embodiment relates to a touch panel.

Recently, a touch panel, which performs an input function through the touch of an image displayed on a display device by an input device, such as a stylus pen or a finger, has been applied to various electronic appliances.

In such a touch panel, a sensing electrode is disposed on a sensing region for detecting a touch, and a wire electrode connected to the sensing electrode is disposed on the other region.

However, the sensing electrode and the wire electrode may be subject to the crack or scratch due to external impact or ESD, so the disconnection may occur due to the defect of the electrodes.

Therefore, a touch panel having a novel structure capable of solving the above problem is required.

BRIEF SUMMARY

The embodiment provides a touch panel having improved reliability.

According to the embodiment, there is provided a touch panel including: a substrate including an active area and an unactive area; a sensing electrode on the active area; a wire electrode on the unactive area; and a connection electrode connected to at least one of the sensing electrode and the wire electrode, wherein at least one of the sensing electrode and the wire electrode includes a plurality of openings, and the openings are divided by the connection electrode.

According to another embodiment, there is provided a touch panel including: a substrate including an active area and an unactive area; a sensing electrode on the active area; and a wire electrode on the unactive area, wherein the sensing electrode comprises a plurality of openings, and the openings extend in a direction corresponding to an extension direction of the sensing electrode.

According to the touch panel of the embodiment, an opening may be formed in the sensing electrode or the wire electrode and a connection electrode may be provided in the opening to connect sub-electrodes.

Thus, when the crack occurs in the sub-electrodes due to the scratch and one of the sub-electrodes is disconnected due to the crack, charges can be moved to another sub-electrode through the connection electrode, so that the complete disconnection of the electrodes can be prevented, thereby improving the reliability of the touch panel.

In addition, according to the touch panel of another embodiment, a plurality of openings may be formed in the sensing electrode or the wire electrode to prevent the crack from being expanded when the crack occurs in the electrodes, so that the complete disconnection of the electrodes can be prevented, thereby improving the reliability of the touch panel.

DETAILED DESCRIPTION

Figure 1:
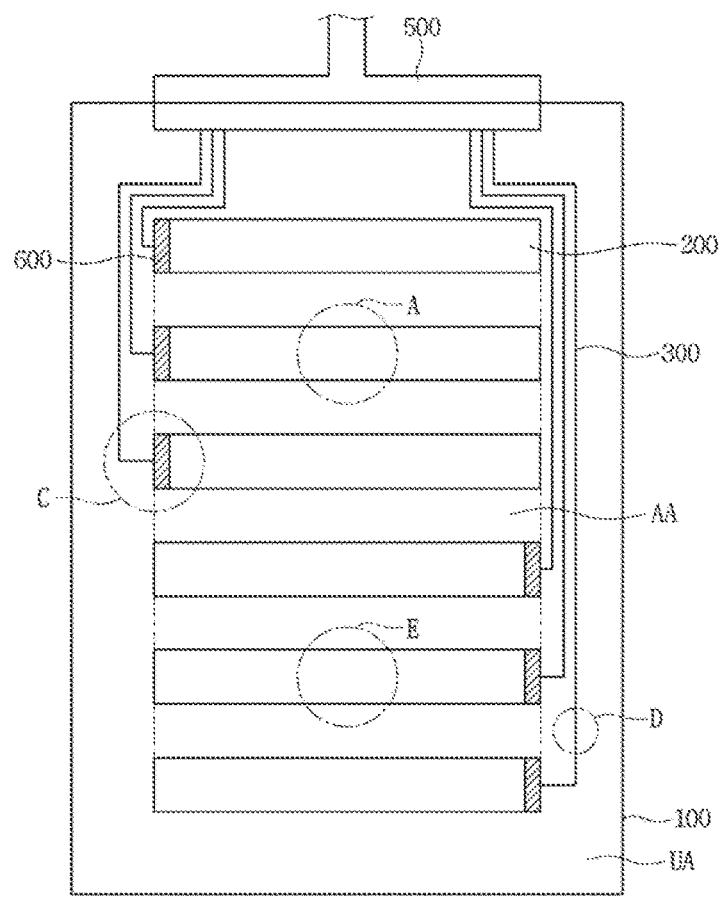
FIG. 1 is a plan view of a touch panel according to the embodiment.

In the following description of the embodiments, it will be understood that, when a layer (film), a region, a pattern or a structure is referred to as being "on" or "under" a substrate, another layer (film), region, pad or patterns, it can be "directly" or "indirectly" on the other layer (film), region, pattern or structure, or one or more intervening layers may also be present. Such a position of each layer will be described with reference to the drawings.

In addition, when a predetermined part "is connected to" another part, this means not only that the predetermined part is directly connected to another part, but also that the predetermined is indirectly connected to another part while interposing another component between the predetermined part and another part. In addition, when a predetermined part "includes" a predetermined component, the predetermined part does not exclude other components, but may further include other components unless indicated otherwise.

The thickness and size of each layer (film), region, pattern or structure shown in the drawings may be modified, so the size of elements shown in the drawings does not utterly reflect an actual size.

Referring to FIG. 1, a touch panel according to the embodiment may include a substrate 100, a sensing electrode 200, a wire electrode 300, and a printed circuit board 500.

The substrate 100 may be flexible or rigid. For example, the substrate 100 may include glass or plastic.

In detail, the substrate 100 may include chemically tempered/semi-tempered glass, such as soda lime glass or aluminosilicate glass, reinforced or soft plastic, such as polyimide (PI), polyethylene terephthalate (PET), propylene glycol (PPG), or polycarbonate (PC), or sapphire.

In addition, the substrate 100 may include an optical isotropic film. For example, the substrate 100 may include cyclic olefin copolymer (COC), cyclic olefin polymer (COP), optical isotropic polycarbonate (PC), or optical isotropic polymethyl methacrylate (PMMA).

The sapphire has superior electric characteristics, such as permittivity, so that a touch response speed may be remarkably increased and a space touch, such as hovering, may be easily implemented. The hovering signifies a technique of recognizing coordinates even at a short distance from a display.

In addition, the cover substrate 100 may be bendable to have a partial curved surface. In other words, the substrate 100 is bendable such that a portion of the substrate has a flat surface and another portion of the substrate has a curved surface. In detail, an end portion of the substrate 100 may be bent with a curved surface or may be curved or bent with a surface having a random curvature.

In addition, the substrate 100 may include a flexible substrate having a flexible property.

Further, the substrate 100 may include a curved substrate or a bended substrate. In other words, the touch window including the substrate 100 may be formed with a flexible, curving, or bending characteristic. Accordingly, the touch window according to the embodiment can be easily portable by a user and may be modified with various designs.

The sensing electrode, the wire electrode and the printed circuit board may be disposed on the substrate 100. That is, the substrate 100 may be a support substrate.

The substrate 100 may include a cover substrate. That is, the sensing electrode, the wire electrode and the printed circuit board may be supported on the cover substrate. Alternatively, an additional cover substrate may be disposed on the substrate 100. That is, the sensing electrode, the wire electrode and the printed circuit board may be supported by the substrate and the substrate may be combined with the cover substrate by an adhesive layer.

The substrate 100 may have an active area AA and an unactive area UA defined therein.

An image may be displayed on the active area AA. The image may not be displayed on the unactive area UA provided at a peripheral portion of the active area AA.

In addition, a position of an input device (e.g., finger) can be detected in at least one of the active area AA and the unactive area UA. If the input device such as the finger touches the touch window, the variation of capacitance occurs in the part touched by the input device, and the touched part subject to the variation of the capacitance may be detected as a touch point.

A printing layer may be disposed on the unactive area UA of the substrate. The printing layer may be formed by coating a material having a predetermined color such that the wire electrode disposed on the unactive area UA and the printed circuit board connecting the wire electrode to an external circuit may not be viewed from the outside.

The printing layer may have a color suitable for a desired outer appearance thereof. For example, the printing layer may include black or white pigments so that the printing layer may represent black or white. In addition, various color films are employed so that various colors, such as red and blue, can be represented.

In addition, a desired logo may be formed in the printing layer through various schemes. The printing layer may be formed through deposition, printing and wet coating schemes.

The printing layer may include at least one layer. For example, the printing layer may include a single layer or at least two layers having mutually different widths.

The sensing electrode 200 may be disposed on the substrate 100. For example, the sensing electrode 200 may be disposed on the active area AA of the substrate 100.

The sensing electrode 200 may include a first sensing electrode and a second sensing electrode. For example, the sensing electrode 200 may include the first sensing electrode and the second sensing electrode which extend in mutually different directions.

Although FIG. 1 shows the sensing electrode extending in one direction, the embodiment is not limited thereto. Another sensing electrode extending in the other direction may be further provided.

In addition, although FIG. 1 shows the sensing electrode extending in one direction in the form of a bar, the embodiment is not limited thereto. The sensing electrode may be formed in various shapes, such as a polygonal shape including a triangular shape or a rectangular shape, or a curved shape.

The sensing electrode 200 may include a transparent conductive material that allows electricity to flow therethrough without interfering with transmission of light. For example, the sensing electrode 200 may include metal oxide such as indium tin oxide (ITO), indium zinc oxide (IZO), copper oxide, tin oxide, zinc oxide, or titanium oxide.

The sensing electrode 200 may include a nanowire, a photosensitive nanowire film, carbon nanotube (CNT), graphene, conductive polymer or a mixture thereof. If a nano composite, such as a nano wire or CNT, is used, the sensing electrode may have a black color. In this case, it is possible to control the color and the reflectivity while ensuring electric conductivity by controlling the content of nano powder.

In addition, the sensing electrode 200 may include various metals. For instance, the sensing electrode 200 may include at least one of Cr, Ni, Cu, Al, Ag, Mo, Au, Ti and an alloy thereof.

Figure 2:
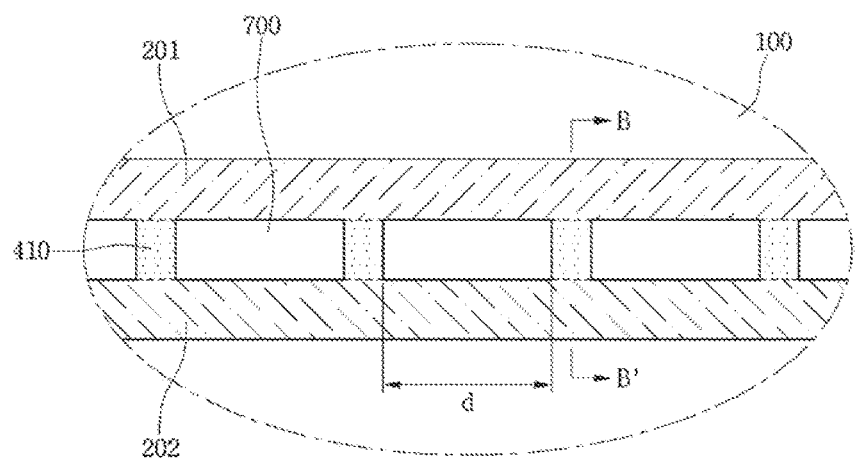
FIGS. 2 and 3 are enlarged sectional views of an A region shown in FIG. 1 according to the first embodiment.
Figure 3:
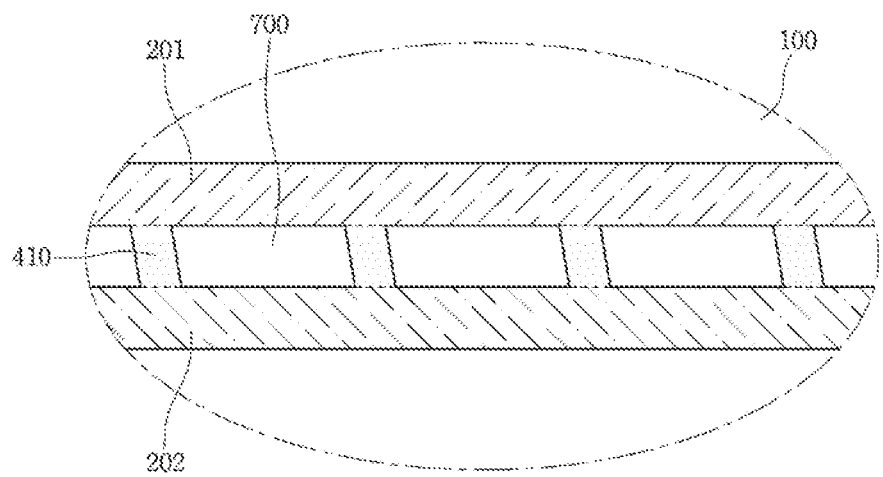
Figure 4:
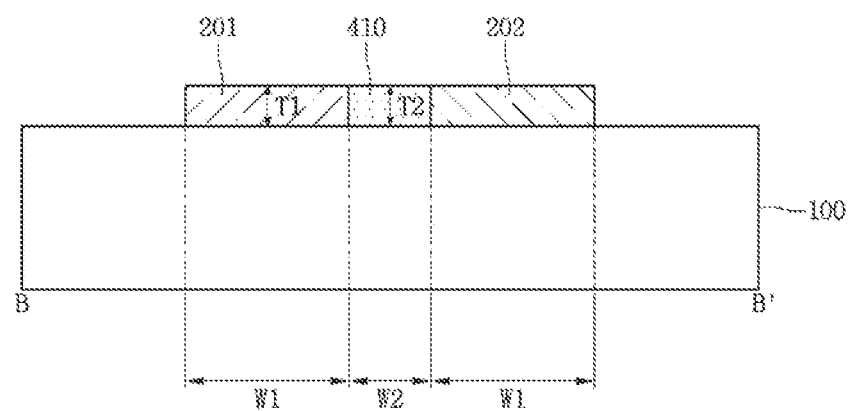
FIG. 4 is a sectional view taken along line B-B' of FIG. 2.

Referring to FIGS. 2 to 4, the sensing electrode 200 may include an opening 700.

For example, the sensing electrode 200 may include a first sub-sensing electrode 201 and a second sub-sensing electrode 202. The first sub-sensing electrode 201 may be spaced apart from the second sub-sensing electrode 202.

The first sub-sensing electrode 201 and the second sub-sensing electrode 202 may be connected with each other. For example, a first connection electrode 410 may be disposed in the opening 700 and the first sub-sensing electrode 201 may be connected to the second sub-sensing electrode 202 through the first connection electrode 410.

At least one first connection electrode 410 may be disposed in the opening 700. For example, as shown in FIGS. 2 and 3, a plurality of first connection electrodes 410 may be disposed in the opening 700.

Thus, the opening 700 may be divided into a plurality of openings by the first connection electrodes 410.

The first connection electrode 410 may extend in a direction different from an extension direction of at least one of the first sub-sensing electrode 201 and the second sub-sensing electrode 202.

For example, referring to FIG. 2, the first connection electrode 410 may extend in a direction intersecting with an extension direction of the first sub-sensing electrode 201 and the second sub-sensing electrode 202.

In addition, referring to FIG. 3, the first connection electrode 410 may extend in a direction inclined with respect to an extension direction of the first sub-sensing electrode 201 and the second sub-sensing electrode 202.

The first connection electrode 410 may include a material corresponding to a material of at least one of the first sub-sensing electrode 201 and the second sub-sensing electrode 202. For example, the first connection electrode 410 may include a material the same as or similar to a material of the sensing electrode 200 described above. Thus, the sensing electrode 200 and the first connection electrode 410 may be simultaneously formed through one process.

In addition, the first connection electrode 410 may be integrally formed with at least one of the first sub-sensing electrode 201 and the second sub-sensing electrode 202. For example, the first connection electrode 410 may be integrally formed with the first sub-sensing electrode 201 and the second sub-sensing electrode 202 without being separated therefrom.

The first connection electrodes 410 may be spaced apart from each other. For example, a spacing distance d between the first connection electrodes 410 may be about 4.5 mm or less. In detail, the spacing distance d between the first connection electrodes 410 may be in the range of about 3.5 mm to about 4.5 mm.

If the spacing distance d between the first connection electrodes 410 is less than about 3.5 mm, the first connection electrodes 410 may be connected to each other, thereby causing the coupling phenomenon. In addition, if the spacing distance d between the first connection electrodes 410 exceeds about 4.5 mm, the charge may not readily move from one sub-sensing electrode to another sub-sensing electrode when the first sub-sensing electrode 201 or the second sub-sensing electrode 202 is disconnected.

Referring to FIG. 4, a width w2 of the first connection electrode 410 may be different from a width w1 of the first sub-sensing electrode and the second sub-sensing electrode. For instance, the width w2 of the first connection electrode 410 may be smaller than the width w1 of the first sub-sensing electrode and the second sub-sensing electrode.

For example, the width w2 of the first connection electrode 410 may be about 0.1 mm or less. In detail, the width w2 of the first connection electrode 410 may be in the range of about 0.03 mm to about 0.1 mm.

If the width w2 of the first connection electrode 410 is less than about 0.03 mm, surface resistance of the first connection electrode 410 may be increased, so that the charging time of the connection electrode may be lengthened. If the width w2 of the first connection electrode 410 exceeds about 0.1 mm, a cap of the connection electrodes may be increased, so that the connection electrodes may interfere with each other, thereby causing the coupling phenomenon.

In addition, the width w1 of the first sub-sensing electrode and the second sub-sensing electrode may be about 0.5 mm or less. In detail, the width w1 of the first sub-sensing electrode and the second sub-sensing electrode may be in the range of about 0.2 mm to 0.5 mm.

If the width w1 of the first sub-sensing electrode and the second sub-sensing electrode is less than about 0.2 mm, surface resistance of the sub-sensing electrode may be increased, so that the charging time of the sub-sensing electrode may be lengthened. If the width w1 of the first sub-sensing electrode and the second sub-sensing electrode exceeds about 0.5 mm, a cap of the sub-sensing electrodes may be increased, so that the sub-sensing electrodes may interfere with each other, thereby causing the coupling phenomenon.

Further, the first connection electrode 410 may come into contact with at least one of the first and second sub-sensing electrodes 201 and 202. For instance, the first connection electrode 410 may come into contact with at least one of a lateral side and a top surface of at least one of the first and second sub-sensing electrodes 201 and 202.

Although FIG. 4 shows the first connection electrode 410, which makes contact with a lateral side of the first sub-sensing electrode 201 and a lateral side of the second sub-sensing electrode 202, the embodiment is not limited thereto. The first connection electrode 410 may be connected to at least one of a lateral side and a top surface of the first sub-sensing electrode 201 and a lateral side and a top surface of the second sub-sensing electrode 202.

The first connection electrode 410 may have a thickness corresponding to at least one of the first and second sub-sensing electrodes 201 and 202. For example, referring to FIG. 4, a thickness t2 of the first connection electrode 410 may correspond to a thickness t1 of the first sub-sensing electrode.

The touch panel according to the embodiment may include the first connection electrode that connects the first and second sub-sensing electrodes.

Thus, when the disconnection occurs due to the scratch generated in the first sub-sensing electrode or the second sub-sensing electrode, the charges can be moved to another sub-sensing electrode through the first connection electrode, so that the disconnection of the sensing electrode may be prevented.

Therefore, the touch panel according to the embodiment can improve the reliability by preventing the electric failure caused by the disconnection of the sensing electrode.

The wire electrode 300 may be disposed on the substrate 100. For instance, the wire electrode 300 may be disposed on the unactive area UA of the substrate 100.

The wire electrode 300 may be connected to the sensing electrode 200. For example, the wire electrode 300 may be connected to the sensing electrode 200 through a pad part 600.

The pad part 600 may include a conductive material. For instance, the pad part 600 may include an anisotropic conductive film (ACF).

The wire electrode 300 may include a conductive material. For instance, the wire electrode 300 may include a material the same as or similar to a material of the sensing electrode 200 described above.

The wire electrode 300 may include a first wire electrode and a second wire electrode. For example, the wire electrode 300 may include the first wire electrode and the second wire electrode which are connected to the first and second sensing electrodes extending in mutually different directions, respectively.

Figure 5:
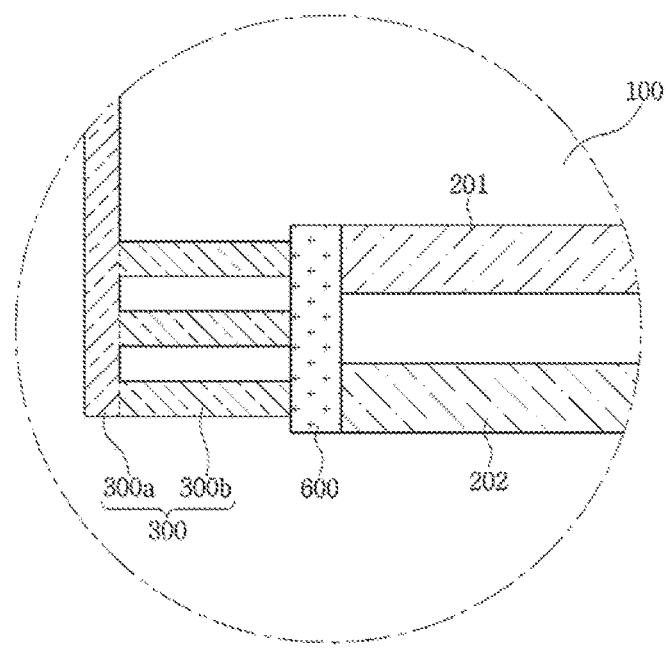
FIG. 5 is an enlarged sectional view of a C region shown in FIG. 1.

In addition, referring to FIG. 5, the wire electrode 300, that is, at least one of the first wire electrode and the second wire electrode may include a 1st' wire electrode 300a and a 2nd' wire electrode 300b.

The 2nd' wire electrode 300b may be connected to the pad part 600 and the 1st' wire electrode 300a. For instance, one end of the 2nd' wire electrode 300b may be connected to the pad part 600 and the other end of the 2nd' wire electrode 300b may be connected to the 1st' wire electrode 300a.

The 2nd' wire electrode 300b may have a width of about 0.8 mm or less. In detail, the 2nd' wire electrode 300b may have a width in the range of about 0.03 mm to about 0.8 mm.

If the 2nd' wire electrode 300b has a width less than about 0.03 mm, the connection between the sensing electrode and the wire electrode may be incomplete. If the 2nd' wire electrode 300b has a width exceeding about 0.8 mm, the unactive area UA may be enlarged, so that a bezel area may be increased.

In addition, the 1st' wire electrode 300a may be connected to the 2nd' wire electrode 300b and the printed circuit board 500. For example, one end of the 1st' wire electrode 300a may be connected to the 2nd' wire electrode 300b and the other end of the 1st' wire electrode 300a may be connected to the printed circuit board 500.

The printed circuit board 500. May include a flexible printed circuit board. A driving chip may be mounted on the printed circuit board 500 and the printed circuit board 500 may perform the operation corresponding to the touch by receiving a touch signal from the sensing electrode through the wire electrode.

At least one 2nd' wire electrode 300b may be provided. For instance, referring to FIG. 5, a plurality of 2nd' wire electrodes 300b may be provided. The 2nd' wire electrodes 300b may be connected to the pad part 600 and the 1st' wire electrode 300a, respectively, while being spaced apart from each other.

Although FIG. 5 shows the 2nd' wire electrodes 300b extending in the same direction, the embodiment is not limited thereto. At least one of the 2nd' wire electrodes 300b may extend in the direction different from the extension direction of other 2nd' wire electrodes 300b.

The touch panel according to the embodiment may include a plurality of 2nd' wire electrodes connected to the 1st' wire electrode and the pad part.

Thus, the disconnection caused by the defect of the 2nd' wire electrode can be prevented when the sensing electrode is connected to the wire electrode through the pad part. In other words, the charges may be moved to the other 2nd' wire electrodes when one of the 2nd' wire electrodes is damaged, so the disconnection of the wire electrode caused by the defect of the 2nd' wire electrodes can be prevented.

Therefore, the touch panel according to the embodiment can improve the reliability by preventing the electric failure caused by the disconnection of the wire electrode.

Hereinafter, a wire electrode according to another embodiment will be described with reference to FIGS. 6 and 7.

Figure 6:
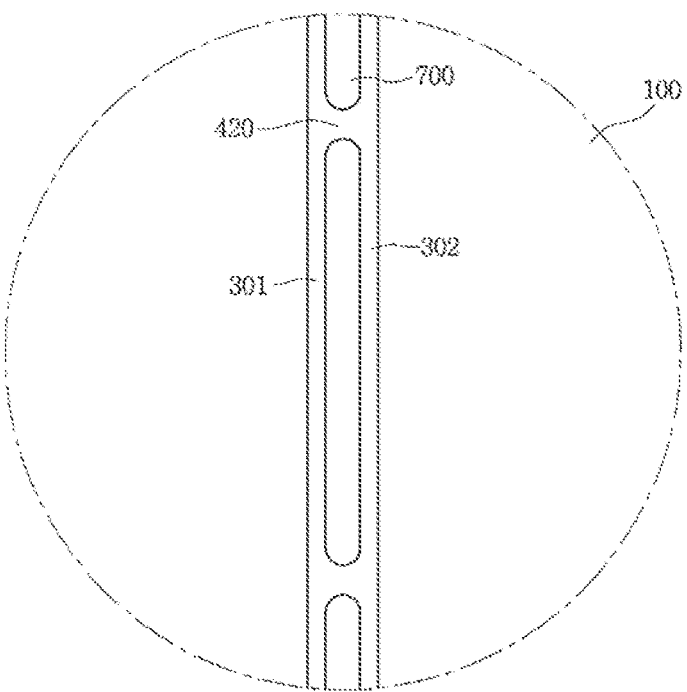
FIGS. 6 and 7 are enlarged views of a D region shown in FIG. 1.

Referring to FIG. 6, the wire electrode 300 may include a first sub-wire electrode 301 and a second sub-wire electrode 302. The first sub-wire electrode 301 and the second sub-wire electrode 302 may be spaced apart from each other.

Thus, the wire electrode 300 may include an opening 700.

The first sub-wire electrode 301 and the second sub-wire electrode 302 may be connected with each other. In detail, the first sub-wire electrode 301 and the second sub-wire electrode 302 may be connected with each other through a second connection electrode 420 disposed in the opening 700.

At least one second connection electrode 420 may be disposed in the opening 700. For example, as shown in FIGS. 6 and 7, a plurality of second connection electrodes 420 may be disposed in the opening 700.

Thus, the opening 700 may be divided into a plurality of openings by the second connection electrodes 420.

The second connection electrode 420 may extend in a direction different from an extension direction of at least one of the first sub-sensing electrode 301 and the second sub-sensing electrode 302.

For example, referring to FIG. 6, the second connection electrode 420 may extend in a direction intersecting with an extension direction of the first sub-sensing electrode 301 and the second sub-sensing electrode 302.

However, the embodiment is not limited to the above. For instance, the second connection electrode 420 may extend in a direction different from an extension direction of the first sub-sensing electrode 301 and the second sub-sensing electrode 302.

The second connection electrode 420 may include a material corresponding to a material of at least one of the first sub-sensing electrode 301 and the second sub-sensing electrode 302. For example, the second connection electrode 420 may include a material the same as or similar to a material of the sensing electrode 300 described above. Thus, the sensing electrode 300 and the second connection electrode 420 may be simultaneously formed through one process.

In addition, the second connection electrode 420 may be integrally formed with at least one of the first sub-sensing electrode 301 and the second sub-sensing electrode 302. For example, the second connection electrode 420 may be integrally formed with the first sub-sensing electrode 301 and the second sub-sensing electrode 302 without being separated therefrom.

A plurality of second connection electrodes 420 may be disposed in the opening 700 while being spaced apart from each other. For example, the second connection electrodes 420 may be spaced apart from each other by a distance of about 0.1 mm to about 0.3 mm. In detail, the second connection electrodes 420 may be spaced apart from each other by a distance of about 0.15 mm to about 0.25 mm. In more detail, the second connection electrodes 420 may be spaced apart from each other by a distance of about 0.18 mm to about 0.22 mm.

If the spacing distance between the second connection electrodes 420 is less than about 0.1 mm, the second connection electrodes 420 may be connected to each other. In addition, if the spacing distance between the second connection electrodes 420 exceeds about 0.3 mm, the width or thickness of the first and second sub-wire electrodes disposed between the second connection electrodes 420 may mismatch with the width or thickness of the first and second sub-wire electrodes disposed between other second connection electrodes 420, so that the wire electrode may be weakened against electrostatic discharge (ESD).

That is, the second connection electrodes 420 may allow the first and second sub-wire electrodes to have the uniform width or thickness.

Figure 7:
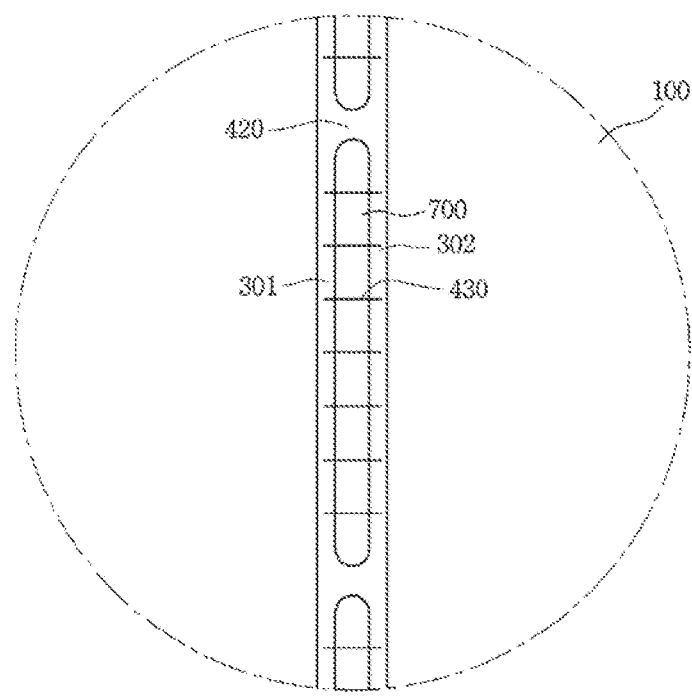

Referring to FIG. 7, the wire electrode 300 according to the embodiment may further include a third connection electrode 430.

The third connection electrode 430 may extend in the direction different from the extension direction of at least one of the first sub-wire electrode 301 and the second sub-wire electrode 302. The second connection electrode 420 and the third connection electrode 430 may extend in correspondence with each other.

Thus, the second connection electrode 420 and the third connection electrode 430 may extend in the direction different from the extension direction of at least one of the first sub-wire electrode 301 and the second sub-wire electrode 302.

The third connection electrode 430 may be disposed between the second connection electrodes 420. For example, at least one third connection electrode 430 may be disposed between the second connection electrodes 420.

For instance, a plurality of third connection electrodes 430 may be disposed between the second connection electrodes 420 while being spaced apart from each other.

For example, the third connection electrodes 430 may be spaced apart from each other by a distance of about 0.1 mm to about 0.3 mm. In detail, the third connection electrodes 430 may be spaced apart from each other by a distance of about 0.15 mm to about 0.25 mm. In more detail, the third connection electrodes 430 may be spaced apart from each other by a distance of about 0.18 mm to about 0.22 mm.

If the spacing distance between the third connection electrodes 430 is less than about 0.1 mm, the third connection electrodes 430 may be connected to each other. In addition, if the spacing distance between the third connection electrodes 430 exceeds about 0.3 mm, the width or thickness of the first and second sub-wire electrodes disposed between the third connection electrodes 430 may mismatch with the width or thickness of the first and second sub-wire electrodes disposed between other third connection electrodes 430, so that the wire electrode may be weakened against electrostatic discharge (ESD).

That is, the third connection electrodes 430 may allow the first and second sub-wire electrodes to have the uniform width or thickness.

The first sub-wire electrode 301, the second sub-wire electrode 302, the second connection electrode 420 and the third connection electrode 430 may include materials corresponding to each other. Thus, the wire electrode 300 and the connection electrode 400 can be simultaneously formed through one process.

In addition, the first sub-wire electrode 301, the second sub-wire electrode 302, the second connection electrode 420 and the third connection electrode 430 may be integrally formed with each other.

The touch panel according to the embodiment may uniformly form the width or thickness of the wire electrode, that is, the first and second sub-wire electrodes. In detail, the second connection electrodes and the third connection electrodes may be disposed between the first and second sub-wire electrodes at a regular interval to connect the first and second sub-wire electrodes, thereby allowing the first and second sub-wire electrodes to have uniform width or thickness.

Thus, the ESD, which may be generated when the wire electrodes have irregular width or thickness, can be prevented, thereby preventing the crack or disconnection of the wire electrode.

Therefore, the touch panel according to the embodiment can improve the reliability by preventing the wire electrode from being damaged.

Hereinafter, a touch panel according to the second embodiment will be described.

Figure 8:
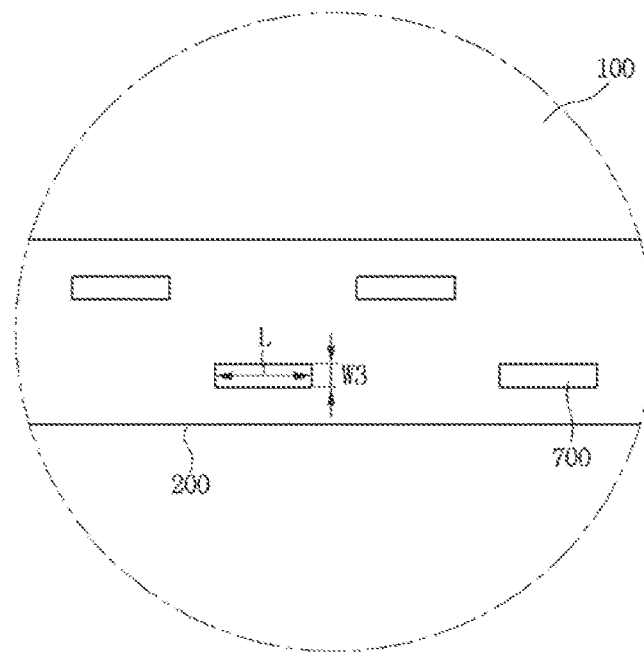
FIGS. 8 to 10 are enlarged views of an E region shown in FIG. 1 according to the second embodiment.

Referring to FIG. 8, a plurality of openings 700 may be formed in the sensing electrode 200. The openings 700 may be formed through the sensing electrode 200 so that one surface of the substrate 100 may be exposed through the openings 700.

The openings 700 may extend in the direction corresponding to the extension direction of the sensing electrode 200.

The openings 700 may be formed by using a mask when the sensing electrode is etched.

Since the openings 700 are formed in the sensing electrode, the openings 700 prevents the expansion of crack when the crack occurs in the sensing electrode 200 due to the scratch, thereby preventing the electrical open of the sensing electrode 200, that is, the disconnection of the sensing electrode 200.

In other words, the openings 700 formed lengthwise along the sensing electrode 200 may be perpendicular to the crack formed widthwise along the sensing electrode 200. Thus, even when the crack occurs widthwise along the sensing electrode 200, the openings 700 can prevent the expansion of crack, so the sensing electrode 200 can be prevented from being electrically disconnected completely.

The openings 700 may have a width in the range of about 30 μm to about 100 μm. In addition, the openings 700 may have a length in the range of about 30 μm to about 800 μm.

If the openings 700 have a width less than about 30 μm and a length less than about 30 μm, the openings 700 cannot prevent the expansion of crack when the crack occurs in the sensing electrode 200 due to the scratch, so that the sensing electrode 200 may be disconnected. In addition, if the openings 700 have a width more than about 400 μm and a length more than about 800 μm, the resistance of the sensing electrode 200 may be increased, so that the charge/discharge operation may be delayed due to the increase of time constant.

Therefore, the openings 700 may be configured to have the width in the range of about 30 μm to about 100 μm and the length in the range of about 30 μm to about 800 μm, in such a manner that the resistance of the sensing electrode 200 can be minimized while preventing the expansion of crack in the sensing electrode 200, thereby improving the reliability and electric property of the touch panel.

Figure 9:
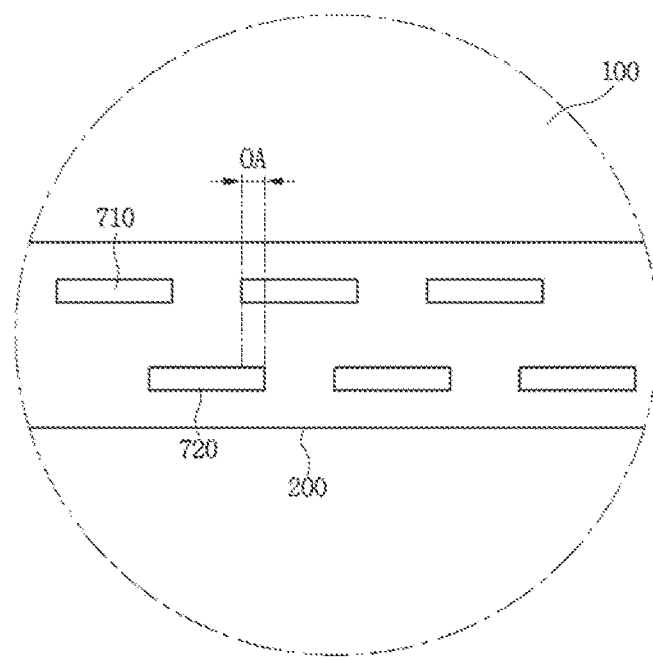

Referring to FIG. 9, the openings 700 may include first openings 710 and second openings 720.

The first openings 710 and second openings 720 may be arranged in a zigzag manner.

For instance, when a plurality of rows are defined in the sensing electrode 200, the first and second openings 710 and 720 may be disposed in mutually different rows, respectively, in a zigzag manner.

The first and second openings 710 and 720 may extend in a direction in correspondence with each other.

In addition, the first and second openings 710 and 720 may include an overlap area OA where the first and second openings 710 and 720 overlap with each other.

For example, when a plurality of columns are defined in the sensing electrode 200, the first and second openings 710 and 720 may be disposed in columns which partially overlap with each other.

Thus, when the crack occurs in the overlap area OA of the sensing electrode 200, the crack may be prevented from being expanded by the first and second openings 710 and 720, so the disconnection of the sensing electrode 200 can be prevented.

In detail, when the crack occurs at an upper portion of the first opening 710 in the overlap area OA, the crack may be prevented from being expanded by the first opening 710. When the crack occurs between the first and second openings 710 and 720 in the overlap area OA, the crack may be prevented from being expanded by the first and second openings 710 and 720. In addition, when the crack occurs at a lower portion of the second opening 720 in the overlap area OA, the crack may be prevented from being expanded by the second opening 720.

Therefore, when the crack occurs at a local area of the sensing electrode 200, the crack may be prevented from being expanded by the first and second openings 710 and 720, so that the sensing electrode 200 can be prevented from being completely disconnected.

Figure 10:
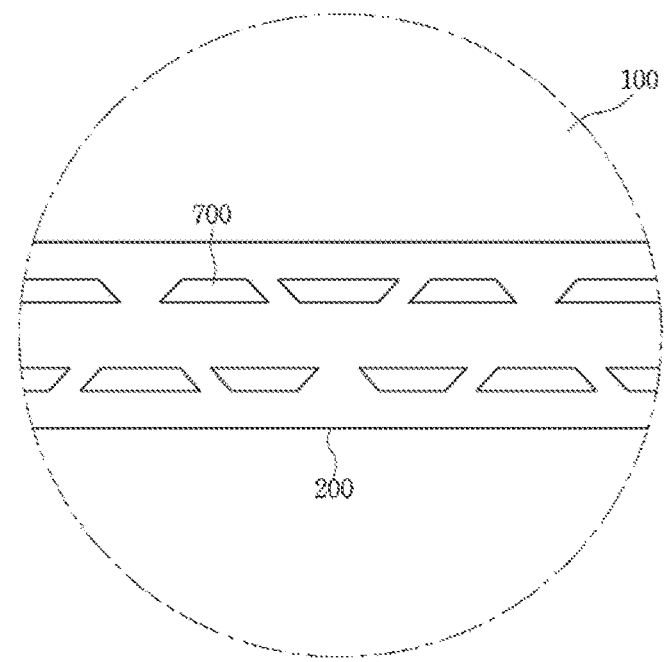

Referring to FIG. 10, the openings 700 may have various shapes. For instance, as shown in FIGS. 8 and 9, the openings 700 may have rectangular shapes. In addition, as shown in FIG. 10, the openings 700 may have an inclined trapezoidal shape. However, the embodiment is not limited thereto. For example, the openings 700 may have polygonal shapes, such as a triangular shape or a hexagonal shape, and a circular shape having a curved surface.

Although FIGS. 8 to 10 illustrate the configuration of the sensing electrode, the configuration of the sensing electrode may also be applied to the wire electrode to prevent the wire electrode from being disconnected.

The touch panel according to the above embodiments may be variously configured depending on the position of the electrode.

Figure 11:
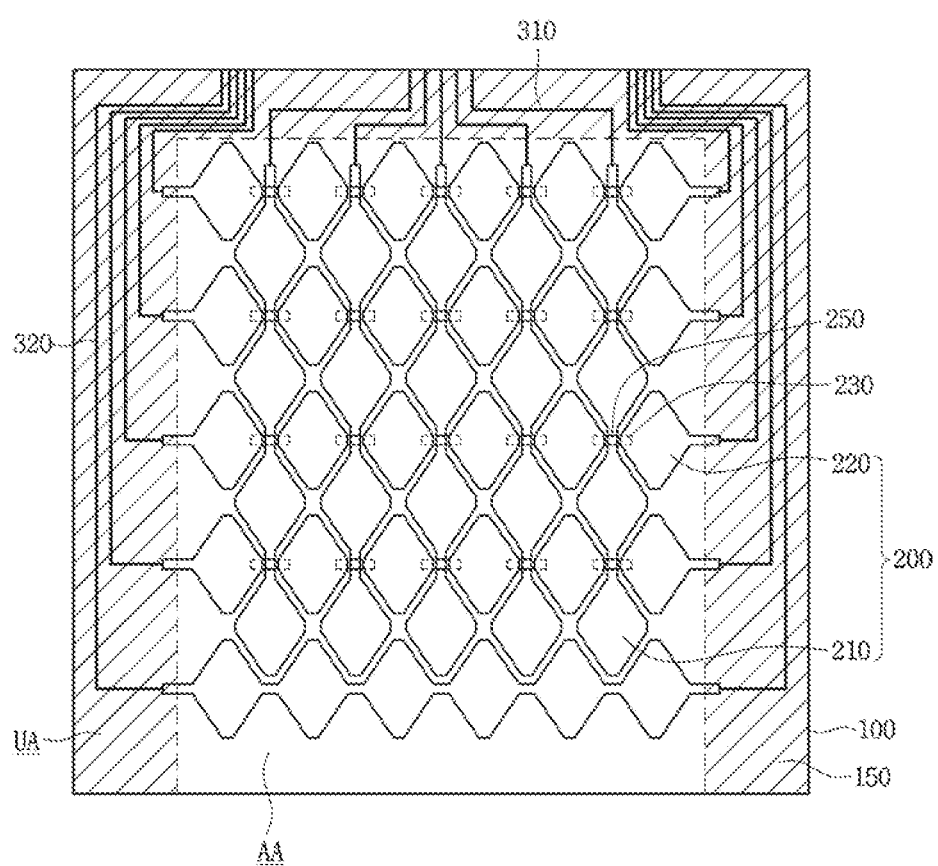
FIGS. 11 to 14 are views to explain various types of touch windows according to the embodiment.

Referring to FIG. 11, the touch panel according to the embodiment may include a substrate 100 as well as a first sensing electrode 210 and a second sensing electrode 220 formed on the substrate 100.

The first sensing electrode 210 may extend in one direction on the active area AA of the substrate 100. In detail, the first sensing electrode 210 may be disposed on one surface of the substrate 100.

In addition, the second sensing electrode 220 may extend in the other direction on the active area AA of the substrate 100 and may be disposed on one surface of the substrate 100. That is, the first and second sensing electrodes 210 and 220 may be disposed on the same plane of the substrate 100 while extending in mutually different directions.

The first and second sensing electrodes 210 and 220 may be insulated from each other on the substrate 100. In addition, a plurality of first unit sensing electrodes, which constitute the first sensing electrode 210, may be connected with each other and a plurality of second unit sensing electrodes, which constitute the second sensing electrode 220, may be spaced apart from each other. The second unit sensing electrodes may be connected with each other by bridge electrodes 230 and insulating layers 250 may be provided in the bridge electrodes 230 to insulate the first sensing electrode 210 from the second sensing electrode 220.

Thus, the first and second sensing electrodes 210 and 220 may not come into contact with each other on the same plane of the substrate 100, that is, on the same plane of the active area AA while being insulated from each other.

A printing layer 150 may be disposed on the unactive area UA of the substrate 100.

The substrate 100 may be a cover substrate. That is, the first and second sensing electrodes 210 and 220 may be disposed on the same plane of the cover substrate. Alternatively, an additional cover substrate may be disposed on the substrate 100.

A first wire electrode 310 and a second wire electrode 320, which are disposed in the unactive area UA, may be connected to the first and second sensing electrodes 210 and 220, respectively.

Figure 12:
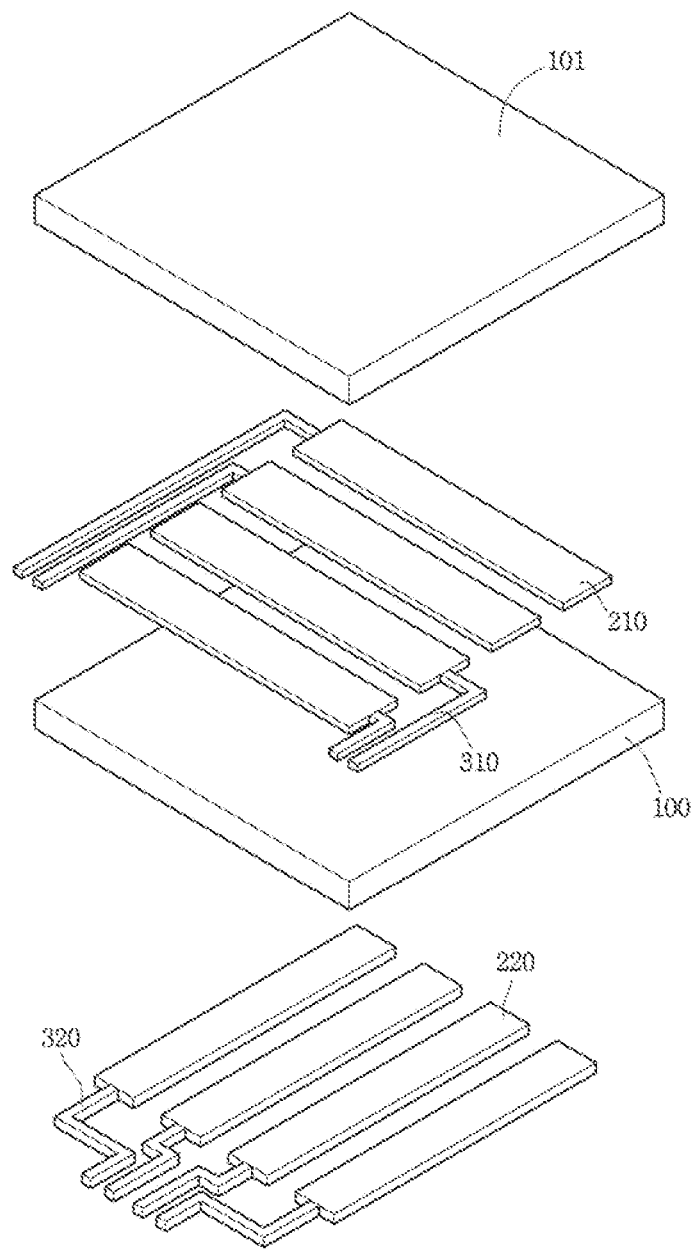

Referring to FIG. 12, the touch panel of another type may include a cover substrate 101 and a substrate 100 as well as a first sensing electrode 210 formed on the cover substrate 101 and a second sensing electrode 220 formed on the substrate 100.

In detail, the first sensing electrode 210 extending in one direction and the first wire electrode 310 connected to the first sensing electrode 210 may be disposed on one surface of the cover substrate 101, and the second sensing electrode 220 extending in the other direction and the second wire electrode 320 connected to the second sensing electrode 220 may be disposed on one surface of the substrate 100.

Alternatively, the sensing electrodes may be disposed only on both surfaces of the substrate 100 without being disposed on the cover substrate 101.

In detail, the first sensing electrode 210 extending in one direction and the first wire electrode 310 connected to the first sensing electrode 210 may be disposed on one surface of the substrate 100, and the second sensing electrode 220 extending in the other direction and the second wire electrode 320 connected to the second sensing electrode 220 may be disposed on the other surface of the substrate 100.

Figure 13:
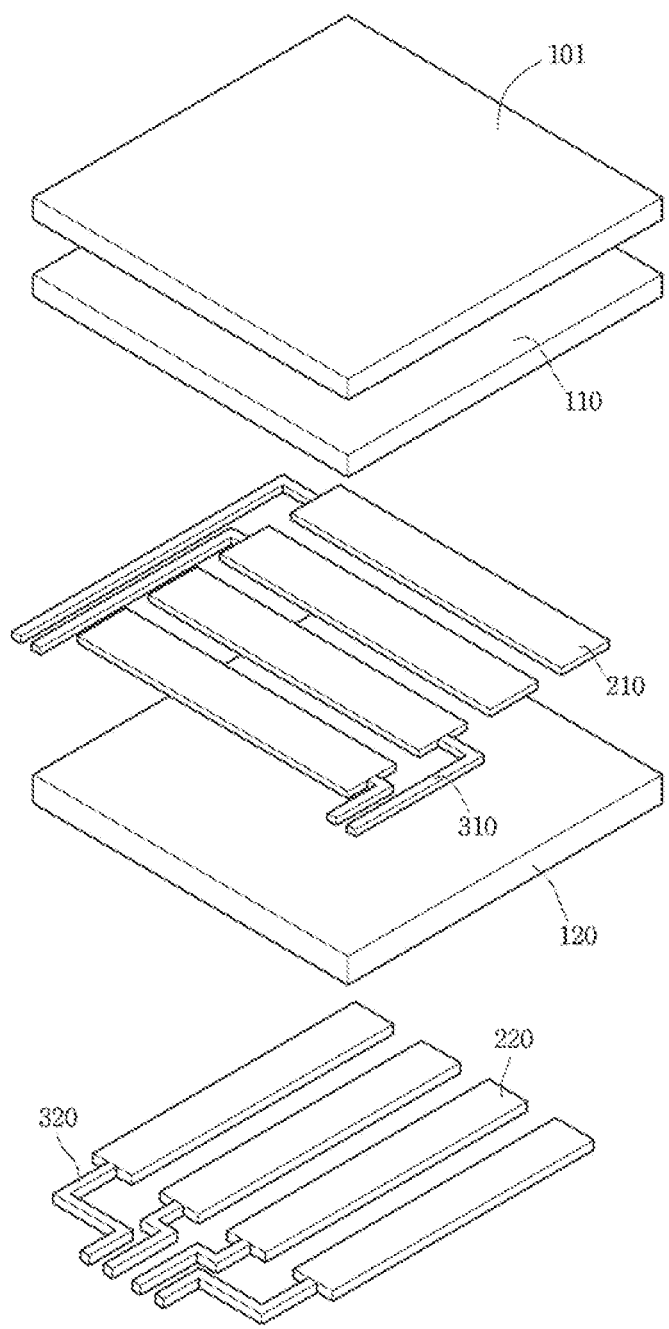

Referring to FIG. 13, the touch panel of another type may include a cover substrate 101, a first substrate 110 and a second substrate 120 as well as a first sensing electrode formed on the first substrate 110 and a second sensing electrode formed on the second substrate 120.

In detail, the first sensing electrode 210 extending in one direction and the first wire electrode 310 connected to the first sensing electrode 210 may be disposed on one surface of the first substrate 110, and the second sensing electrode 220 extending in the other direction and the second wire electrode 320 connected to the second sensing electrode 220 may be disposed on one surface of the second substrate 120.

Figure 14:
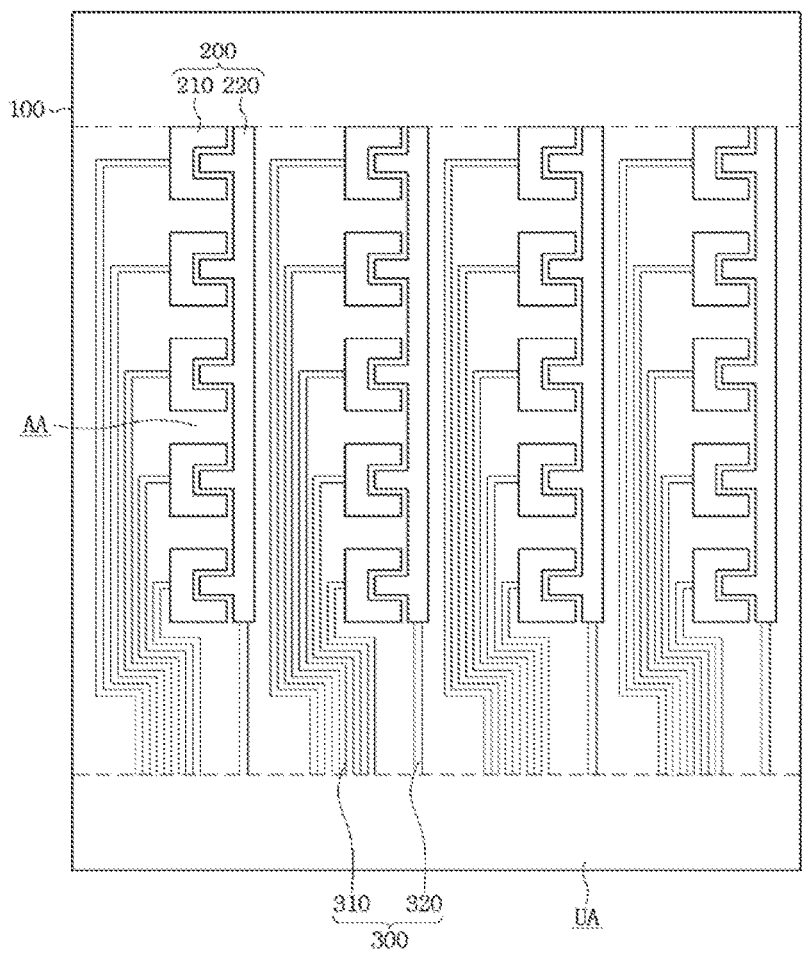

Referring to FIG. 14, the touch panel of another type may include a substrate 100 as well as a first sensing electrode 210 and a second sensing electrode 220 formed on the substrate 100.

The first and second sensing electrodes 210 and 220 may be disposed on the same plane of the substrate 100. For instance, the first and second sensing electrodes 210 and 220 may be spaced apart from each other on the same plane of the substrate 100.

In addition, the first wire electrode 310 may be connected to the first sensing electrode 210 and the second wire electrode 320 may be connected to the second sensing electrode 220. The first wire electrode 310 may be disposed on the active area and the unactive area of the substrate 100 and the second wire electrode 320 may be disposed on the unactive area of the substrate 100.

The touch panel described above may be combined with a display panel so as to be used in a touch device. For instance, the touch panel may be combined with the display panel by an adhesive layer.

Figure 15:
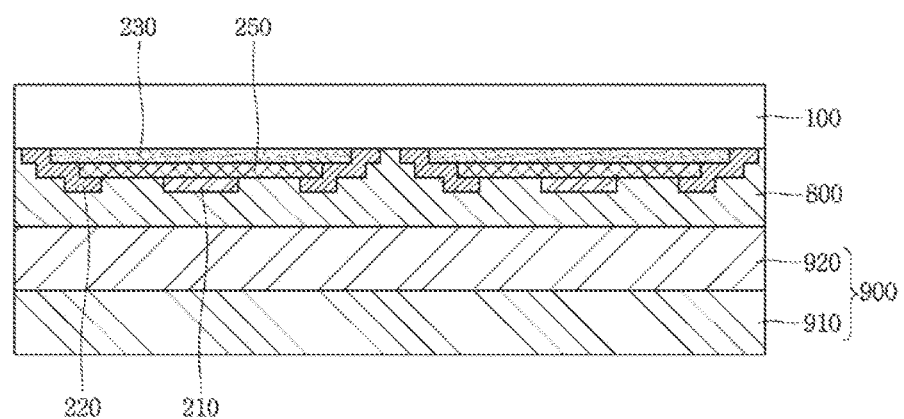
FIGS. 15 to 17 are views to explain a touch device including a touch window coupled with a display panel according to the embodiment.

Referring to FIG. 15, a touch device according to the embodiment may include a touch panel disposed on a display panel 900.

In detail, referring to FIG. 15, the touch device may be realized by combining the substrate 100 with the display panel 900. For example, the substrate 100 may be combined with the display panel 900 by an adhesive layer 800 including optical transparent adhesive such as OCA or OCR.

The display panel 900 may include a 1st' substrate 910 and a 2nd' substrate 920.

When the display panel 900 is a liquid crystal display panel, the display panel 900 may be formed in a structure in which the 1st' substrate 910 including a thin film transistor (TFT) and a pixel electrode is combined with the 2nd' substrate 920 including color filter layers while a liquid crystal layer is interposed between the 1st' and 2nd' substrates 910 and 920.

In addition, the display panel 90 may be a liquid crystal display panel having a COT (color filter on transistor) structure in which a thin film transistor, a color filter, and a black matrix are formed on the 1st' substrate 910, and the 1st' substrate 910 is combined with the 2nd' substrate 920 while a liquid crystal layer is interposed between the 1st' and 2nd' substrates 910 and 920. In other words, the thin film transistor may be formed on the 1st' substrate 910, a protective layer may be formed on the thin film transistor, and the color filter layer may be formed on the protective layer. In addition, a pixel electrode making contact with the thin film transistor is formed on the 1st' substrate 910. In this case, in order to improve the aperture rate and simplify the mask process, the black matrix may be omitted, and the common electrode may serve as the black matrix.

In addition, when the display panel 900 is a liquid crystal panel, the display device may further include a backlight unit for providing light from the rear surface of the display panel 900.

When the display panel 900 is an organic electroluminescent display panel, the display panel 900 includes a self-light emitting device which does not require any additional light source. The display panel 900 includes a thin film transistor formed on the 1st' substrate 910 and an organic light emitting device (OLED) making contact with the thin film transistor. The OLED may include an anode, a cathode and an organic light emitting layer formed between the anode and the cathode. In addition, the 2nd' substrate 920 may be further formed on the organic light emitting device to perform the function of an encapsulation substrate for encapsulation.

Figure 16:
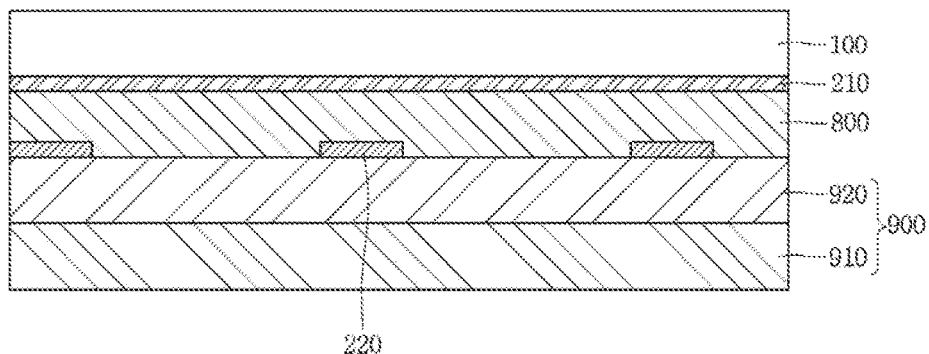

Referring to FIG. 16, the touch device according to the embodiment may include a touch panel integrally formed with the display panel 900. In other words, the substrate to support at least one sensing electrode may be omitted.

In detail, at least one sensing electrode may be provided on at least one surface of the display panel 900. In other words, at least one sensing electrode may be formed on at least one surface of the 1st' substrate 910 or the 2nd' substrate 920.

In this case, at least one sensing electrode may be formed on a top surface of a substrate disposed at a high position.

Referring to FIG. 16, the first sensing electrode 210 may be provided on one surface of the substrate 100. In addition, a first wire connected with the first sensing electrode 210 may be provided. The second sensing electrode 220 may be provided on one surface of the display panel 900. In addition, a second wire connected with the second sensing electrode 220 may be provided.

The adhesive layer 800 may be interposed between the substrate 100 and the display panel 900, so that the substrate 100 may be combined with the display panel 900.

In addition, a polarizing plate may be additionally provided under the substrate 100. The polarizing plate may be a linear polarizing plate or an anti-reflection polarizing plate. For example, when the display panel 900 is a liquid crystal panel, the polarizing plate may be a linear polarizing plate. In addition, when the display panel 900 is an organic electroluminescent display panel, the polarizing plate may be an anti-reflection polarizing plate.

At least one substrate to support the sensing electrode may be omitted from the touch device according to the embodiment. Accordingly, a thin and light touch device can be formed.

Figure 17:
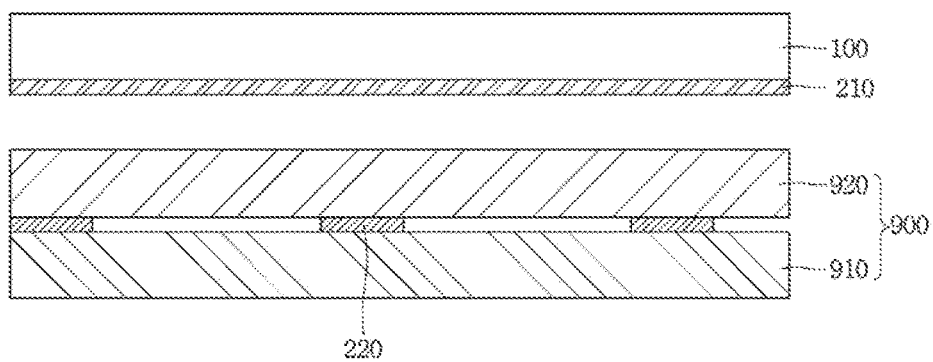

Referring to FIG. 17, the touch device according to the embodiment may include a touch panel formed integrally with the display panel 900. In other words, a substrate to support at least one sensing electrode may be omitted.

For example, a sensing electrode provided in the active area to serve as a sensor which senses a touch and a wire to apply an electrical signal to the sensing electrode may be formed inside the display panel. In detail, at least one sensing electrode or at least one wire may be formed inside the display panel.

The display panel 900 may include the 1st' substrate 910 and the 2nd' substrate 920. In this case, at least one of the first and second sensing electrodes 210 and 220 may be interposed between the 1st' substrate 910 and the 2nd' substrate 920. In other words, at least one sensing electrode may be provided on at least one surface of the 1st' substrate 910 or the 2nd' substrate 920.

Referring to FIG. 17, the first sensing electrode 210 may be provided on one surface of the substrate 100. In addition, the first wire connected with the first sensing electrode 210 may be provided. The second sensing electrode 220 and the second wire may be interposed between the 1st' substrate 910 or the 2nd' substrate 920. In other words, the second sensing electrode 220 and the second wire may be provided inside the display panel, and the first sensing electrode 210 and the first wire may be provided outside the display panel.

The second sensing electrode 220 and the second wire may be provided on the top surface of the 1st' substrate 910 or the rear surface of the 2nd' substrate 920.

In addition, a polarizing plate may be additionally provided under the substrate 100.

When the display panel is a liquid crystal panel, and when the second sensing electrode is formed on the top surface of the 1st' substrate 910, the second sensing electrode may be formed together with a thin film transistor (TFT) or a pixel electrode. In addition, when the second sensing electrode is formed on the rear surface of the 2nd' substrate 920, a color filter layer may be formed on the sensing electrode or the sensing electrode may be formed on the color filter layer. When the display panel is an organic electroluminescent display panel, and when the second sensing electrode is formed on the top surface of the 1st' substrate 910, the second sensing electrode may be formed together with a thin film transistor or an organic light emitting device.

At least one substrate to support the sensing electrode may be omitted from the touch device according to the embodiment. Accordingly, a thin and light touch device can be formed. In addition, the sensing electrode and the wire can be formed together with a device formed on the display panel, so that a process can be simplified and a cost can be reduced.

FIGS. 18 to 21 are views showing one example of a touch device employing the touch panel according to the embodiment.

Figure 18:
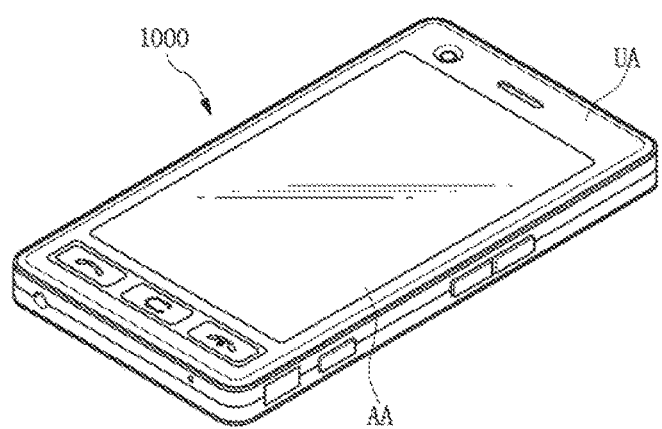
FIGS. 18 to 21 are views showing examples of touch devices employing a touch window according to the embodiment.

Referring to FIG. 18, a mobile terminal 1000 may include the active area AA and the unactive area UA. The active area AA is an area in which a touch signal is sensed due to the touch by a finger, and an instruction icon pattern part and a logo may be formed in the unactive area UA.

Figure 19:
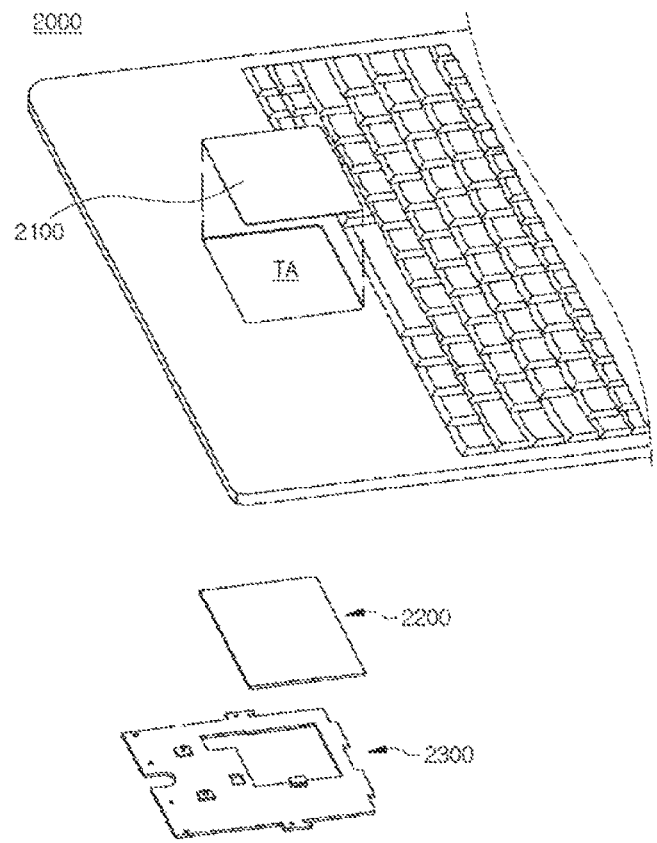

Referring to FIG. 19, a portable laptop computer is illustrated as an example of a display device. The portable laptop computer 2000 may include a touch panel 2200, a touch sheet 2100 and a circuit board 2300. The touch sheet 2100 may be provided on a top surface of the touch panel 2200. The touch sheet 2100 may protect a touch area TA. In addition, the touch sheet 2100 may improve the touch feeling of a user. Further, the circuit board 2300 may be electrically connected to the touch panel 2200 at the bottom surface of the touch panel 2200. The circuit board 2300 may be a printed circuit board on which various components of the portable laptop computer can be mounted.

Figure 20:
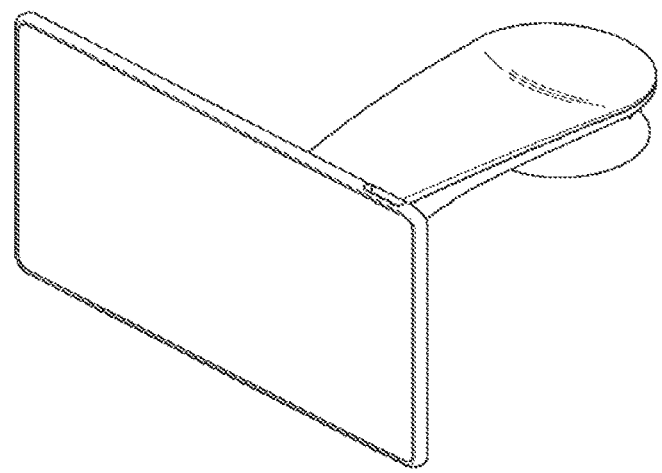

In addition, referring to FIG. 20, the touch panel may be applied to a vehicle navigation system 3000.

Figure 21:
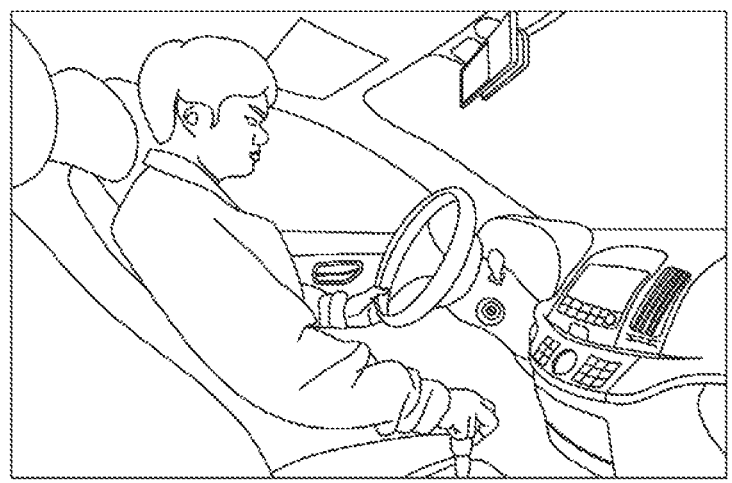

Referring to FIG. 21, the touch panel may be applied inside a vehicle. In other words, the touch panel may be applied to various parts in the vehicle where the touch panel is applied. Accordingly, the touch panel is applied to a dashboard as well as a PND (Personal Navigation Display), thereby realizing a CID (Center Information Display). However, the embodiment is not limited thereto. In other words, the touch panel may be used in various electronic products. In addition, the touch panel may be applied to a wearable device put on a human body.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch panel comprising:
   a substrate including an active area and an unactive area;
   a sensing electrode on the active area;
   a wire electrode on the unactive area; and
   a connection electrode connected to each of the sensing electrode and the wire electrode and comprising a plurality of first connection electrodes and a plurality of second connection electrodes;
   wherein the sensing electrode includes a plurality of sensing electrode openings, and the sensing electrode openings are divided by the first connection electrodes;
   wherein the wire electrode includes a plurality of wire electrode openings, and the wire electrode openings are divided by the second connection electrodes;
   wherein the sensing electrode comprises a first sensing electrode and a second sensing electrode;
   wherein at least one of the first and second sensing electrodes comprises a first sub-sensing electrode and a second sub-sensing electrode, which are spaced apart from each other;
   wherein the wire electrode comprises a first sub-wire electrode and a second sub-wire electrode, which are spaced apart from each other;
   wherein the wire electrode openings are provided between the first sub-wire electrode and the second sub-wire electrode;
   wherein the first connection electrodes connect the first and second sub-sensing electrodes, and the second connection electrodes connect the first and second sub-wire electrodes; and
   wherein the second connection electrodes extend in a direction different from an extension direction of the first and second sub-wire electrodes.

2. The touch panel of claim 1, wherein the first and second sensing electrodes are disposed on a same plane of the substrate.

3. The touch panel of claim 1, wherein the first connection electrodes are spaced apart from each other at an interval of 3.5 mm to 4.5 mm.

4. The touch panel of claim 1, wherein each first connection electrode is connected to at least one of a lateral side and a top surface of the first sub-sensing electrode and at least one of a lateral side and a top surface of the second sub-sensing electrode.

5. The touch panel of claim 1, wherein the first connection electrodes extend in a direction different from the extension direction of the first and second sub-sensing electrodes.

6. The touch panel of claim 1, wherein the first and second sub-sensing electrodes and the first connection electrodes are integrally formed with each other.

7. The touch panel of claim 1, wherein the first and second sub-sensing electrodes and the first connection electrodes comprise materials corresponding to each other.

8. The touch panel of claim 1, wherein the first connection electrode has a width smaller than a width of at least one of the first sub-sensing electrode and the second sub-sensing electrode.

9. The touch panel of claim 8, wherein the width of the first connection electrode is in a range of 0.03 mm to 0.1 mm, and the width of at least one of the first sub-sensing electrode and the second sub-sensing electrode is in a range of 0.2 mm to 0.5 mm.

10. The touch panel of claim 1, wherein the first and second sub-sensing electrodes are connected to the wire electrode through a pad part, the wire electrode comprises at least one 1st' wire electrode and at least one 2nd' wire electrode, and the 1st' wire electrode is connected to the pad part and the 2nd' wire electrode.

11. The touch panel of claim 1, wherein the second connection electrodes are spaced apart from each other at an interval of 0.1 mm to 0.3 mm.

12. The touch panel of claim 1, wherein the first sub-wire electrode, the second sub-wire electrode, and the second connection electrodes comprise materials corresponding to each other.

13. The touch panel of claim 1, wherein the first sub-wire electrode, the second sub-wire electrode, and the second connection electrodes are integrally formed with each other.

14. A touch panel comprising:
    a substrate including an active area and an unactive area;
    a sensing electrode on the active area;
    a wire electrode on the unactive area; and
    a connection electrode connected to each of the sensing electrode and the wire electrode and comprising a plurality of first connection electrodes and a plurality of second connection electrodes;
    wherein the sensing electrode includes a plurality of sensing electrode openings, and the sensing electrode openings extend in a direction corresponding to an extension direction of the sensing electrode;
    wherein the wire electrode includes a plurality of wire electrode openings, and the wire electrode openings are divided by the second connection electrodes;
    wherein the sensing electrode comprises a first sensing electrode and a second sensing electrode;
    wherein at least one of the first and second sensing electrodes comprises a first sub-sensing electrode and a second sub-sensing electrode, which are spaced apart from each other;
    wherein the wire electrode comprises a first sub-wire electrode and a second sub-wire electrode, which are spaced apart from each other;
    wherein the wire electrode openings are provided between the first and the second sub-wire electrode,
    wherein first connection electrodes connect the first and second sub-sensing electrodes, and the second connection electrodes connect the first and second sub-wire electrodes;
    wherein the second connection electrodes extend in a direction different from an extension direction of the first and second sub-wire electrodes.

15. The touch panel of claim 14, wherein each sensing electrode opening has a width in a range of 30 µm to 100 µm.

16. The touch panel of claim 14, wherein each sensing electrode opening has a length in a range of 30 µm to 800 µm.

17. The touch panel of claim 14, wherein the sensing electrode openings comprise first sensing electrode openings and second sensing electrode openings that are aligned in a zigzag manner, and the first and second sensing electrode openings comprise an overlap area.

* * * * *